(12) United States Patent
Baumann et al.

(10) Patent No.: US 6,536,780 B2
(45) Date of Patent: Mar. 25, 2003

(54) HAND POWER TOOL

(75) Inventors: Otto Baumann, Leinfelden-Echterdingen (DE); Ulrich Bohne, Kohlberg (DE); Rolf Mueller, Leinfelden-Echterdingen (DE); Dietmar Saur, Gomaringen (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 09/778,227

(22) Filed: Feb. 7, 2001

(65) Prior Publication Data

US 2001/0017447 A1 Aug. 30, 2001

(30) Foreign Application Priority Data

Feb. 10, 2000 (DE) .......................... 100 05 910

(51) Int. Cl.$^7$ .................... B23B 31/107; B23B 31/10
(52) U.S. Cl. .................. 279/19.4; 279/75; 279/905; 279/22
(58) Field of Search ................ 279/19.4, 22, 30, 279/75, 905

(56) References Cited

U.S. PATENT DOCUMENTS

| 4,174,113 A | * | 11/1979 | Eckman |
| 4,491,444 A | * | 1/1985 | Rumpp |
| 5,199,833 A | | 4/1993 | Fehrle et al. |
| 5,437,465 A | | 8/1995 | Voegele et al. |
| 5,603,516 A | | 2/1997 | Neumaier |
| 5,741,263 A | * | 4/1998 | Umber |

FOREIGN PATENT DOCUMENTS

| DE | 34 43 186 C2 | 12/1993 |
| DE | 44 18 103 A1 | 11/1995 |
| DE | 196 21 610 A1 | 12/1997 |
| GB | 2 297 513 A | 8/1996 |

* cited by examiner

Primary Examiner—Sebastiano Passaniti
(74) Attorney, Agent, or Firm—Michael J. Striker

(57) ABSTRACT

A hand power tool has a tool holder with a base body; a drive part; at least one locking body for connecting the base body of the tool holder with the drive part; a securing body which radially fixes the at least one locking body in an engaging position; an actuating element operative for unlocking the tool holder and guiding the securing body to a position which radially releases the locking body, the base body in a locking position surrounding at least a part of the drive part.

9 Claims, 4 Drawing Sheets

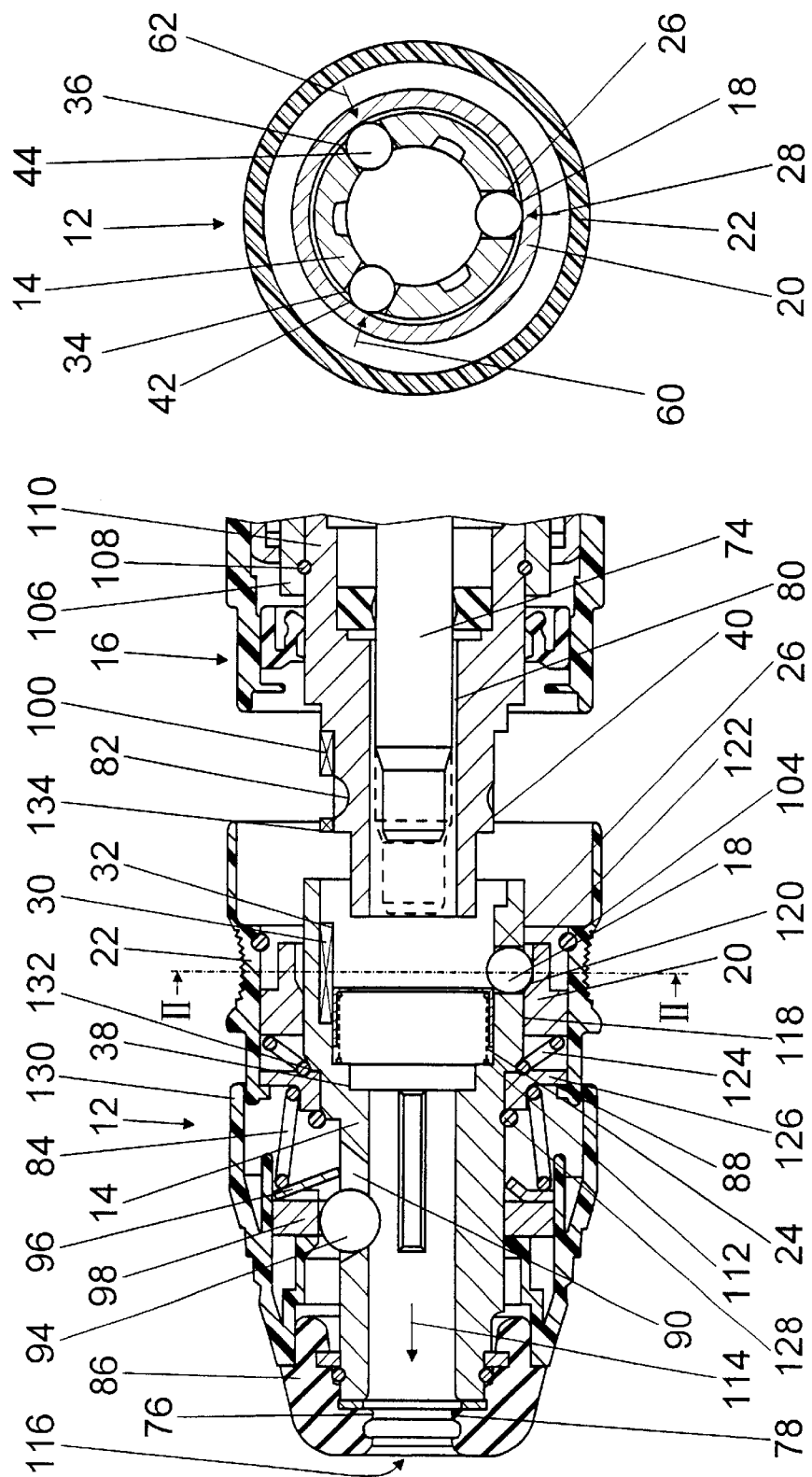

HAND POWER TOOL

BACKGROUND OF THE INVENTION

The present invention relates generally to hand power tools.

German patent document DE 196 21 610 A1 discloses a hand power tool with a removable tool holder. The hand power tool has a spindle sleeve, in which a base body of the tool holder is insertable and lockable by locking bodies. The locking bodies are non releasably held in the spindle sleeve and are radially covered in a locking position by a securing body. For removing the tool holder, the securing body is displaceable by an actuating sleeve axially to a position which radially releases the locking bodies.

SUMMARY OF THE INVENTION

Accordingly, it is an object of the present invention to provide a hand power tool of the above mentioned general type, which is a further improvement of the existing hand power tools.

More particularly, it is an object of the present invention to provide a hand power tool, in which a tool holder is connectable by its base body releasably with a drive part through at least one locking body.

In accordance with the invention, the locking body in its engaging position is radially fixable by a securing body, which is guided by an actuating element for unlocking the tool holder to a position which radially releases the locking bodies.

It is proposed that the base body in its locking position is surrounded by at least a part of the drive part. An anvil can form with the drive part gap seal, which protects the drive unit of the hand power tool from dirt. A low wear can be therefore obtained and damages during insertion of the tool can be avoided. Furthermore, the locking bodies can be mounted on the base body of the tool holder and can be easily replaced or changed with the tool holder when needed.

In accordance with a further embodiment, it is proposed that in the unlocked condition a component holds the locking body in its unlocking position. The tool holder can be easily mounted on the drive part without displacing the locking body. Furthermore, with the component, a recess of the locking body is preferably radially inwardly closed, and a dirtying in the region of the locking body can be avoided, in particular in the dismounted condition. The locking bodies can be loaded in its unlocking position in the locking direction, and thereby an advantageous acoustic and/or optical signal can be provided which signals to a consumer a reliable connection between the tool holder and the drive part. Furthermore, by the position of the locking body, simply a signal can be released through which an energy supply of the hand power tool is controllable. With the not completely mounted tool holder, the energy supply can be interrupted, a damage to the tool can be reliably prevented, and the user can be protected.

Advantageously, several recesses can be arranged over the periphery of the drive part as locking bodies in the base body. Thereby a small turning angle can be obtained during joining the tool holder and the drive part. With the high number of the recesses, the wear of several recesses can be avoided, so that a greater service life can be obtained.

For providing automatic turning of the tool holder to the proper location during fitting of the tool holder on the drive part, the base body and the drive part are advantageously connected through at least one set of teeth in the peripheral direction. In the axial direction they can have reduced contact surfaces, or in other words inclined and/or rounded contact surfaces. The teeth can have a flat contact surfaces in the axial direction and can be guided by hand to a proper position.

Advantageously the base body and the drive part are connected in a peripheral direction via at least one roller mounted on the base body. Instead of the locking body, advantageously the roller can be used as an abutment for the locking bodies in the dismounted condition of the arrestable component, and the locking bodies can be covered in their unlocking position completely by the component in a structural simple manner. Furthermore, a standard component can be used as a roller, and the rotary transmission can be performed in a cost favorable manner.

In accordance with a further embodiment of the present invention, it is proposed that at least one locking body is used for torque transmission. Additional components, as well as structural space, weight and mounting expenses can be saved, or available rotary transmission element can be supported in its function. For example, the locking body formed as a sphere can be guided in a recess formed as a spherical calotte so that a favorable force transmission can be provided. In order to obtain a small surface pressure, the locking body, in addition to being formed as a sphere, can be also formed with different shapes, for example roller-shaped parallelopiped-shaped, etc. A high torque can be transmitted with a simultaneously reduced wear and higher service life.

It is further proposed that the base body has a stepped inner contour to the drive part, and the drive part has a corresponding outer contour. A good guidance and thereby true running are provided by the cylindrical guiding diameter at the front and at the rear receiving region.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a section of a hammer drill with a tool holder in accordance with the present invention;

FIG. 2 is a view showing a section of the inventive tool holder taken along the line II—II in FIG. 1;

DESCRIPTION OF THE PREFERRED EMBODIMENTS

Figure 3:
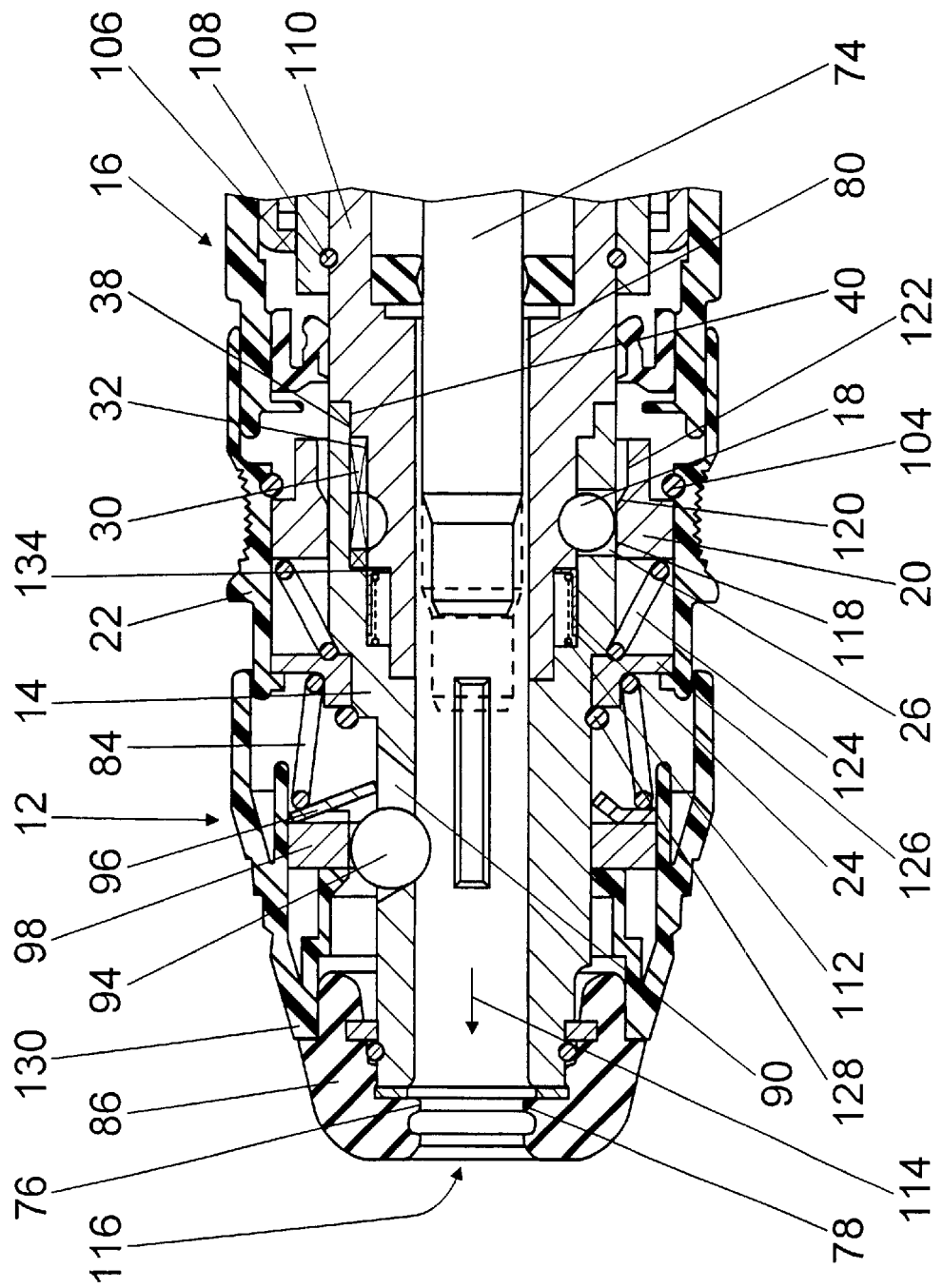
FIG. 3 is a view showing an inventive tool holder of FIG. 1 in the engaged condition.

FIG. 1 shows an unlocked tool holder 12 of a hammer drill. It is releasably connectable with its base body 14 to a drive part 16 through three locking bodies 18, 42, 44 shown in FIG. 2. In their engaging position, the locking bodies 18, 42, 44 are readily fixable by a securing ring 20. The securing ring is guidable via an actuating sleeve 22 to a position which radially releases the locking bodies 18, 42, 44.

The drive part 16 has a spindle sleeve 110, in which an anvil 74 is guided. The spindle sleeve 110 is mounted via a clamping ring 108 in a hammer tube 106. The spindle sleeve 110 and the hammer tube 106 can be formed of one piece with one another.

In accordance with the present invention, the base body 14 of the tool holder 12 in a locking position surrounds the spindle sleeve 110 shown in FIGS. 1, 2 and 3. The locking bodies 18, 42, 44 are arranged in the base body 14 and held in their unlocking position via a component formed as a securing sleeve 24. The securing sleeve 24 is loaded with a helical spring 112 in direction of the drive part 16. It is supported with one end on the locking bodies 18, 42, 44 and fixes them in their radially outer position.

The securing ring 20 has a first region 118 with a smaller inner diameter and a second region 122 with a greater inner diameter. A transition between the diameters is performed through an incline 120. The securing ring 20 abuts radially outwardly against the actuating sleeve 22. In the unlocking position, the locking bodies 18, 42, 44 act as an abutment for the securing ring 22 which is loaded in direction of the drive part 16 by a helical spring 124. The helical spring 124 is supported with one end via a ring 126 and a clamping ring 128 against the base body 14. The locking bodies 18, 42, 44 are loaded radially inwardly in their locking directions 28, 60, 62 via an incline 120 formed of the safety ring 20.

The base body 14 and the drive part 16 are connectable through a set of teeth 30 in the peripheral direction. It has contact surfaces 32 which are narrowed or inclined in an axial direction. The spindle sleeve 110 of the drive part 16 has spherical-calotte-shaped recesses 82, for receiving the locking bodies 18, 42, 44 in their engaging position. Thereby they are usable for the torque transmission. Several recesses 82 are arranged over the periphery of the spindle sleeve 110 as locking bodies 18, 42, 44, in the base body 14. Furthermore, the base body 14 has an inner contour 38 which is stepped to the spindle sleeve 110, and the spindle 110 forms a gap seal 80 with the anvil 74.

When the base body 14 is fitted on the spindle sleeve 110, the teeth 30 with their contact surfaces 32 which face in the axial direction and are narrowing, lead the base body 14 automatically in the correct locking position to the corresponding recesses 100 of the spindle sleeve 110. When the locking bodies 18, 42, 44 are located over the recesses 82, the securing sleeve 24 is supported against an abutment 134 of the spindle sleeve 110 and displaced against the spring force of the helical spring 112 in direction 114, so that the locking bodies 18, 42, 44 are radially inwardly released. The locking bodies 18, 42, 44 are pressed by the helical spring 124 via the incline 120 of the safety ring 20, radially inwardly into the recesses 26, 34, 36.

The helical spring 124 displaces the safety ring 20 with the region 118 radially over the locking bodies 18, 42, 44 and secures them in their locking positions. The securing ring 20 is supported in direction of the drive part 16 via a clamping ring 104 which is mounted in the actuating sleeve 22, through the actuating sleeve 22, and through a projection 88 formed on the actuating sleeve 22, against the ring 126. The ring 126 is supported via a projection 132 against the base body 14. FIG. 3 shows the tool holder 12 which is fitted on the drive part 16 and engaged.

A tool receptacle 116 for the tool with a grooved shaft is arranged in the base body 14. The tool receptacle 116 has a radially displaceable locking body 19 formed as a locking ball 94. It is guidable in the grooves of the tool which are closed on the shaft end, and is held in its locking position by a locking ring 98 which is axially movable within certain limits and by a holding plate 96. The locking ring 98 is loaded via the holding plate 96 with a spring 84 in direction of its locking position. In the locking position of the locking ball 94 the locking ring 98 radially overlaps the locking ball 94 and the holding plate 96 secures the locking ball 94 with a projection in an axial direction.

During insertion of the tool, the locking ball 94 is displaced by the shaft end of the tool in a longitudinal slot 90 in an insertion direction. The holding plate 96 is displaced on its projection over the locking ball 94 against the spring 84. Between the locking spring 98 and the holding plate 96 there is a free space, in which the locking ball 94 can be radially outwardly deviated. The tool can be therefore inserted. Subsequently, the pre-stressed spring 84 displaces the holding plate 96 to its initial position and presses the locking ball 94 in the groove of the tool. For protecting the tool receptacle 116 from dirt, a rubber cap 86 with sealing lips 76, 78 is mounted in the front region of the base body 14.

For removing the tool, an actuating sleeve 130 displaces the locking ring 98 against the holding plate 96 and against the spring 84 which loads the holding plate 26. Therefore the locking balls 94 can deviate radially outwardly and the tool can be removed. After this, the spring 84 presses the holding plate 26, the locking plate 96, the locking ring 28 and the locking ball 94 back to their initial positions.

The connection between the tool holder 12 and the drive part 16 is separated, by displacing the actuating sleeve 22 in direction 114 of the tool receptacle 116. Via the clamping ring 104 which is mounted on the actuating sleeve 22, the securing ring 20 is axially displaced in direction 114 of the tool receptacle 116 against the spring force of the helical spring 124, until the securing ring 20 with its second region 122 radially outwardly releases the locking bodies 18, 42, 44.

The securing sleeve 24 which is loaded by the helical spring 112 presses against the abutment 134 of the spindle sleeve 110 and supports the pulling out of the tool holder 12. The locking bodies 18, 42, 44 during the axial movement of the tool holder 12 are pressed radially outwardly by the calotte-shaped recesses 82 and held in their radially outer position by the securing ring 20.

The connection between the drive part 16 and the tool holder 12 is opened, and the locking bodies 18, 42, 44 are fixed so that they can not be lost. The spring-loaded securing ring 20 abuts with its incline 120 against the locking bodies 18, 42, 44 and loads them in their locking directions 28, 60, 62.

Figures 4, 5:
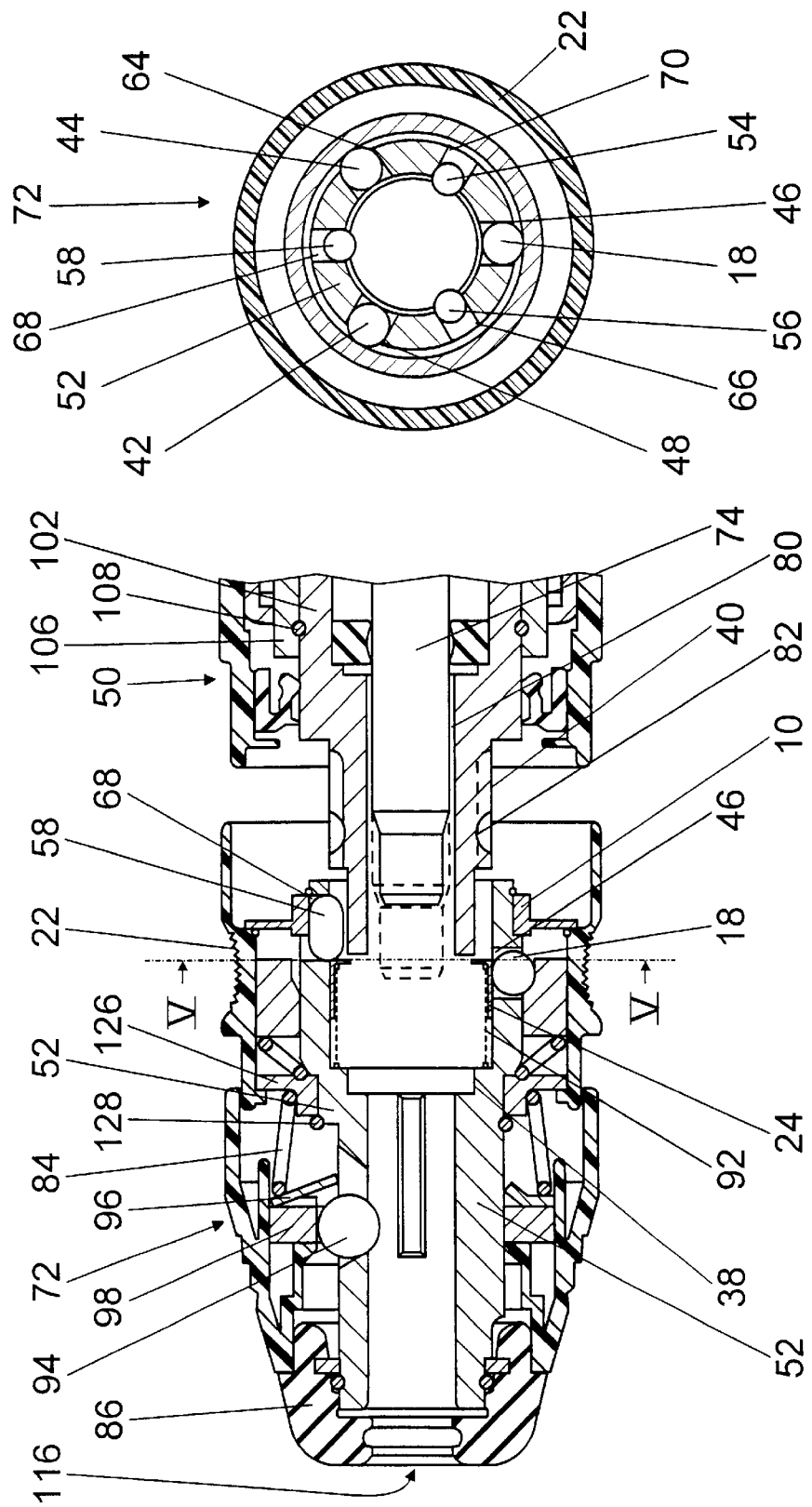
FIG. 4 is a view showing a variant of FIG. 1, with rollers for rotation of the tool holder.
FIG. 5 is a view showing a section of the inventive tool holder, taken along the line V—V in FIG. 4.
Figure 6:
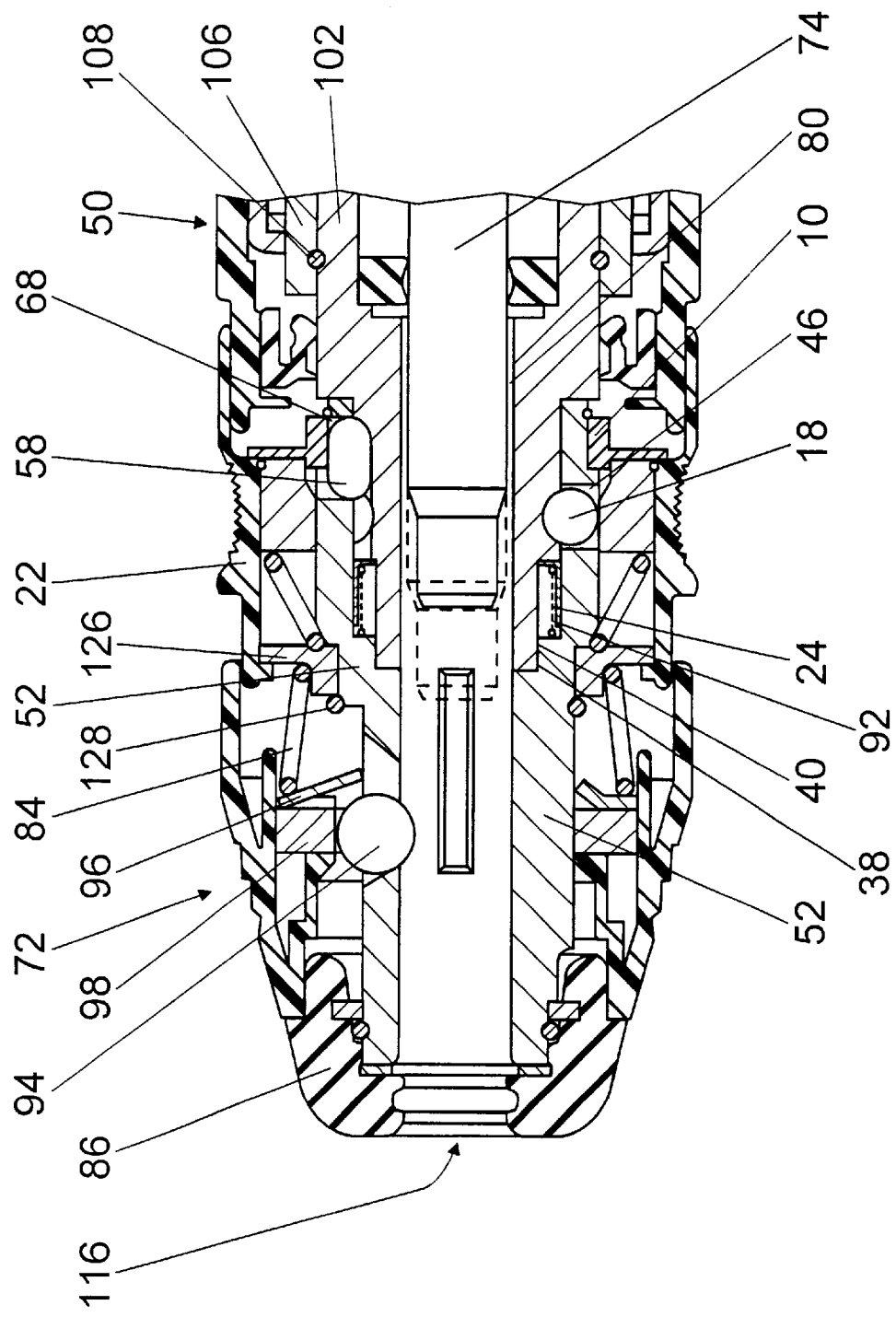
FIG. 6 is a view showing a tool holder of FIG. 4 in the engaged condition.

FIGS. 4–6 show further embodiment of the hammer drill with a tool holder 72 and a drive part 50. Substantially the same remaining parts are identified with the same reference numerals. The differences between the embodiment of FIGS. 4–6 and the embodiment of FIGS. 1–3 are described herein below. With respect to the remaining functions and features, the description of FIGS. 1–3 can be utilized in this embodiment as well.

In contrast to the embodiment shown in FIG. 1, the tool holder 72 has a base body 52 which is connectable in a peripheral direction with a spindle sleeve 102 of the drive part 50, instead of the teeth 30 through three rollers 54, 56, 58 which are mounted on the base body 52. The locking bodies 18, 42, 44, and the rollers 54, 56, 58 are arranged in the recesses 46, 48, 64, 66, 68, 70 of the base body 52 as shown in FIG. 5. The recesses 66, 68, 70 of the rollers 54, 56, 58 are radially inwardly narrowed, and thereby the rollers 54, 56, 58 are limited radially inwardly with respect to their movement. The rollers 54, 56, 58 are held radially outwardly by a ring 10.

The locking bodies 18, 42, 44 are held in their radially outer position or unlocking positions via the securing ring 24, which is loaded via a helical spring 92 in direction of the drive part 50 and is supported on the rollers 54, 56, 58. The securing sleeve 24 closes the recesses 26, 34, 36 of the locking bodies 18, 42, 44 radially inwardly.

It will be understood that each of the elements described above, or two or more together, may also find a useful application in other types of constructions differing from the types described above.

While the invention has been illustrated and described as embodied in hand power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand power tool, comprising a tool holder having a base body; a drive part; at least one locking body for connecting said base body of said tool holder with said drive part; a securing body which radially fixes said at least one locking body in an engaging position; an actuating element operative for unlocking said tool holder and guiding said securing body to a position which radially releases said locking body, said base body in a locking position surrounds at least a part of said drive part; and a component which in an unlocked position holds said at least one locking body in its unlocking position.

2. A hand power tool as defined in claim 1, wherein said at least one locking body is arranged in said tool holder.

3. A hand power tool as defined in claim 2, wherein said drive part is provided on a periphery with a plurality of recesses formed as said locking bodies in said base body.

4. A hand power tool as defined in claim 1, wherein said at least one component has a recess which radially inwardly closes said locking body.

5. A hand power tool as defined in claim 1, wherein said at least one locking body is loaded in its unlocking position in a locking direction.

6. A hand power tool as defined in claim 1, and further comprising at least one set of teeth which connects said base body and said drive part in a peripheral direction, said teeth having narrowing contact surfaces in an axial direction.

7. A hand power tool as defined in claim 1, and further comprising at least one roller which connects said base body and said drive part in a peripheral direction.

8. A hand power tool as defined in claim 1, wherein said at least one locking body is formed so that it is usable for a torque transmission.

9. A hand power tool as defined in claim 1, wherein said base body has an inner contour which is stepped toward said drive part, while said drive part has a corresponding outer contour.

* * * * *